July 30, 1957 W. L. ABEL ET AL 2,800,729
MOLDED PLASTIC SHOE UPPER COMPONENTS
Filed Feb. 15, 1955 3 Sheets-Sheet 2
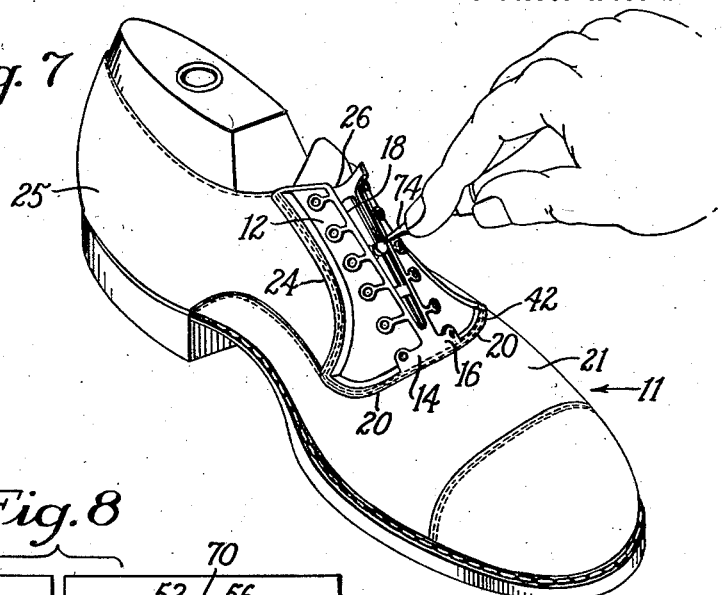
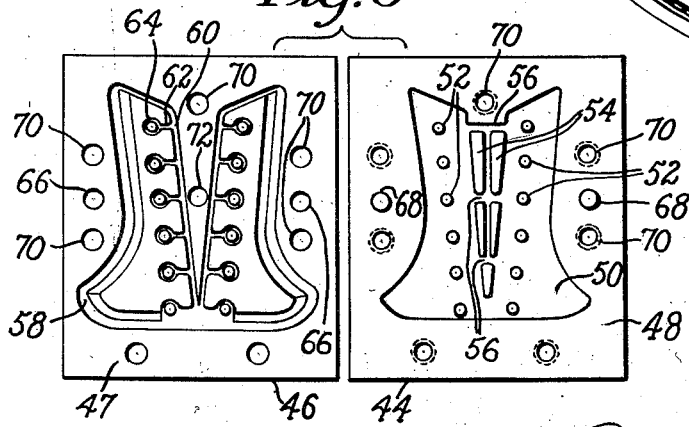
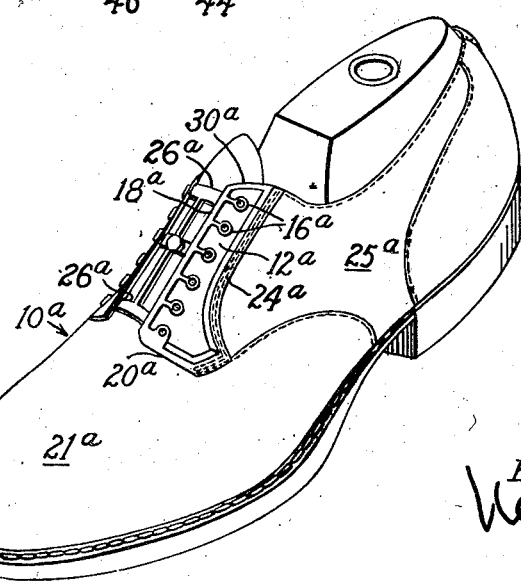
Inventors
Walter L. Abel
Charles B. Noonan
By their Attorney

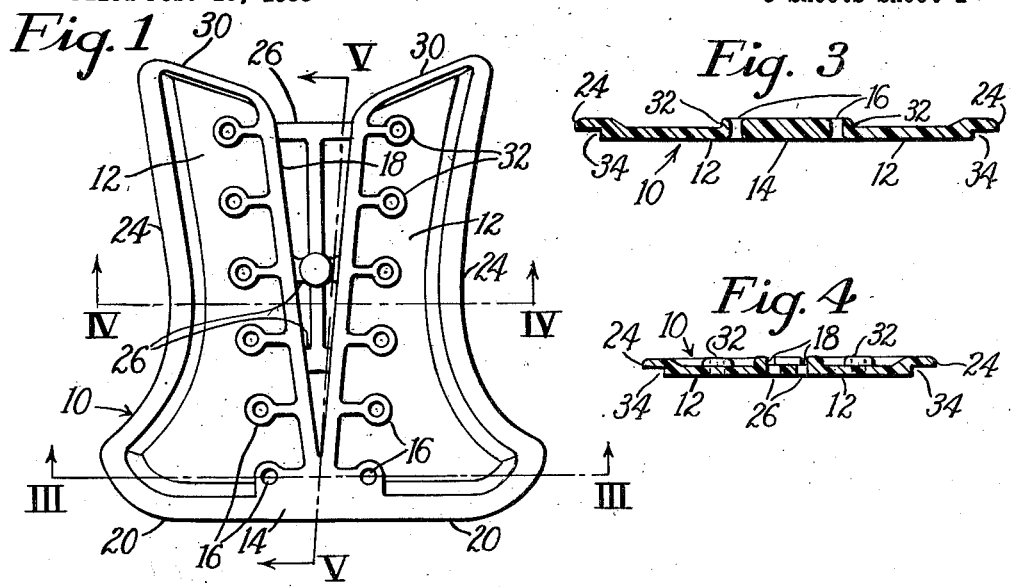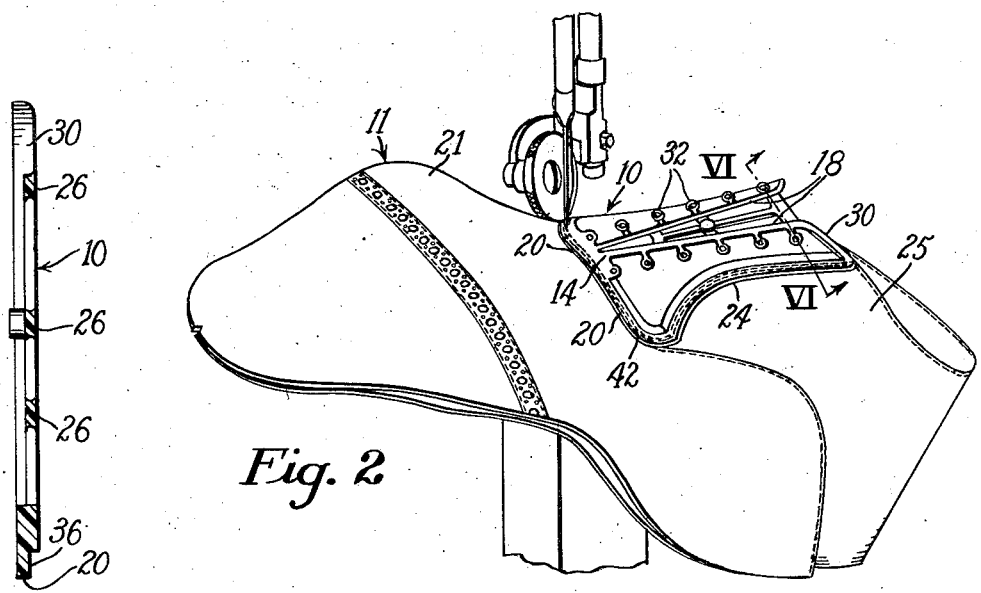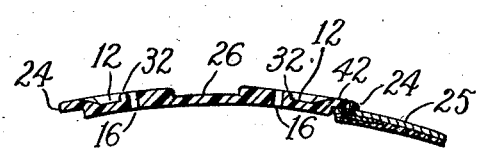

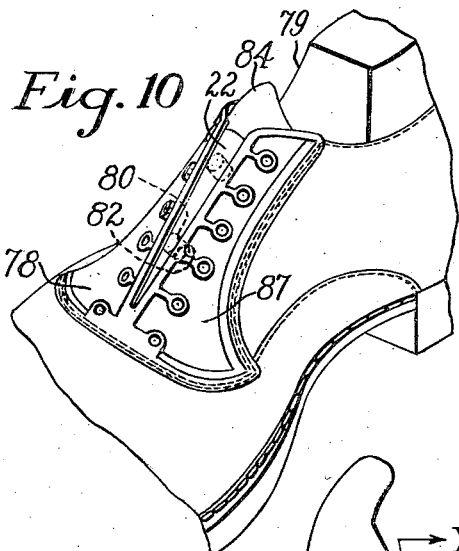
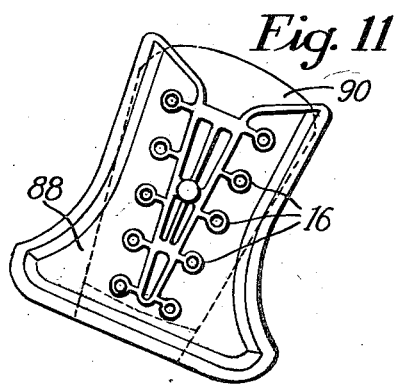
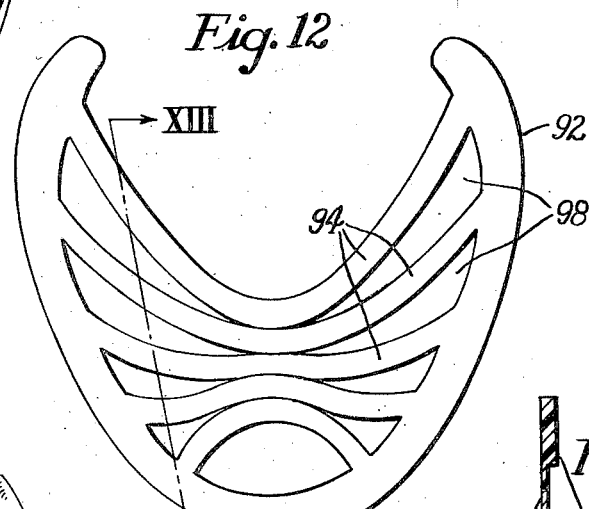
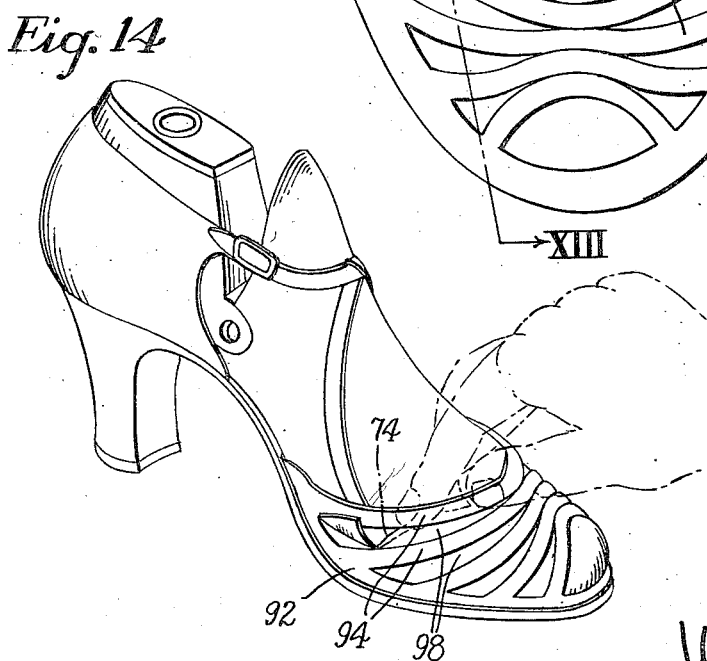
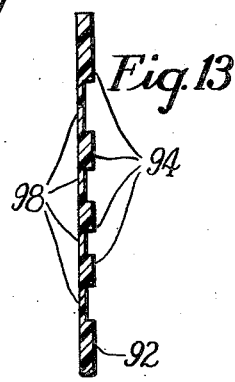
Inventors
Walter L. Abel
Charles B. Noonan
By their Attorney

United States Patent Office 2,800,729
Patented July 30, 1957

2,800,729

MOLDED PLASTIC SHOE UPPER COMPONENTS

Walter L. Abel, Wenham, and Charles B. Noonan, Newburyport, Mass., assignors to United Shoe Machinery Corporation, Flemington, N. J., a corporation of New Jersey Application February 15, 1955, Serial No. 488,266

6 Claims. (Cl. 36—52)

This invention relates to shoe parts and particularly to an integral molded shoe upper segment for use in combination with other conventional shoe upper components.

Shoe uppers are composed of a number of individual parts stitched or otherwise joined together and brought to desired shape by being stretched on a last. Under the stresses of lasting, open portions of a shoe, for example, the lacing opening of a lace type shoe, or spaces between stripping or in cut-outs in women's shoes, give more freely than the solid portions. To prevent distortion, lace type shoes are provided with a temporary cord lacing to hold the lacing portions in desired relationship; and cut-out or strip type shoes are usually provided with a continuous supplementary lining which distributes lasting stresses, but which must be cut out by hand or by a trimming machine after lasting of the shoe. Also some difficulty has been encountered with fraying or loose threads at the edges of the remaining portions of the supplementary lining.

It is an object of the present invention to provide a novel integral shoe upper segment adapted to be assembled with other portions of a shoe upper.

More particularly, it is an object of the invention to provide an integral molded plastic throat piece for shoe uppers combining in itself portions which conventionally are separate parts requiring to be stitched or otherwise joined.

It is a further object of the invention to provide a throat piece and tongue molded as a unit, of plastic material, for assembly with the vamp and quarters of a shoe upper to constitute the only upper component in that area of a finished shoe.

The foregoing objects are obtained through incorporating in a shoe a novel integral plastic shoe segment including a stress absorbing member extending between spaced sheet portions and preferably combining a plurality of portions of a shoe normally provided as distinct elements. The simple operation of securing in place this combined unit takes the place of the multiple operations of assembling, stitching together and reinforcing separate portions in a shoe upper.

The invention will be described further in connection with the drawings forming part of the disclosure. In the drawings, Fig. 1 is a plan view of a molded throat piece including lacing portions of an upper and constructed in accordance with out invention;

Fig. 2 is an angular view showing the molded throat piece of Fig. 1 being stitched into an unlasted upper;

Fig. 3 is a cross section of the throat piece of Fig. 1 taken on the line III—III thereof;

Fig. 4 is a cross section of the throat piece of Fig. 1 taken on the line IV—IV thereof;

Fig. 5 is a cross section of the throat piece of Fig. 1 taken on the line V—V thereof;

Fig. 6 is a partial section on the line VI—VI of Fig. 2 showing the joint between the throat piece and the quarter of the shoe upper;

Fig. 7 is an angular view of a lasted shoe including the molded throat piece and showing the step of cutting the connecting members from across the openings in the molded throat piece prior to removal of the shoe from the last;

Fig. 8 is a plan view of mold plates which may be used in forming a throat piece;

Fig. 9 is an angular view of a lasted upper including a molded unit providing lacing portions of the blucher type;

Fig. 10 is a fractional angular view of a lasted shoe including a modified form of a molded throat piece having positioning members on the integral connecting member;

Fig. 11 is an angular view of a modification of the molded throat piece including a tongue joined to the lacing portions of the throat piece;

Fig. 12 is a top view of a molded plastic forward portion of the upper of a woman's shoe showing connecting or reinforcing members extending across openings in the upper;

Fig. 13 is a cross section of the molded plastic forward portion of Fig. 12 taken on the line XIII—XIII of Fig. 12; and Fig. 14 is an angular view of a finished shoe including the molded plastic forward portion of Fig. 12 illustrating the removal of the connecting and reinforcing members prior to removal of the shoe from the last.

Plastic segments useful in shoes to simplify shoe construction according to the present invention include portions having a general thickness and surface character to cooperate with further portions of a shoe upper for assembly with such other portions to form a completed shoe. In the shoe segments, areas corresponding to normally spaced separate shoe portions are linked together in spaced relation by an integral reinforcing member which holds the areas in determined relationship for convenience in shoe assembly, i. e. in a fitting room, and which also provides the strength necessary to resist spreading apart of such areas when the upper is stretched over a last.

The shoe segment shown in Fig. 1 and hereinafter referred to as a "throat piece" 10 is a flexible article formed of plastic and having a contour, thickness and outline for assembly with other shoe parts (as shown in Fig. 2) in a shoe upper 11. The throat piece 10 includes sheet-like lacing portions 12 joined by a thick plastic section or bar 14 below and/or across their lowermost eyelet holes 16. The lacing portions 12 have inner edges 18 defining a lacing opening, lower edges 20 shaped for union with the vamp 21 of the shoe upper 11 and side edges 24 shaped for union with the quarter 25 of the shoe upper 11. A reinforcing member, shown as transverse struts 26, integral with the lacing portions 12 extends across the lacing opening to maintain the lacing portions 12 in determined relationship during assembly and lasting of the shoe. It will be understood that a continuous membrane 22, for example as shown in Fig. 10, may be used as reinforcing member in place of the struts 26 although the continuous membrane 22 is not as desirable from some aspects such as ease of removal, etc. The reinforcing member, whether struts or membrane, eliminates the necessity for the temporary cord lacing between the lacing portions 12 heretofore required in the making of shoes of this type.

The throat piece structure shown in Figs. 1 through 7 combines other features which eliminate steps in the assembly of a shoe. The bar 14, which is of relatively thick cross section of plastic integral with the lacing portions 12 (see Figs. 1 and 3), joins the lacing portions at their forward ends strongly so that the conventional stitch or staple type barring of the V-section of the throat piece is not required. The inner and top edges 18 and 30 of the lacing portions are thickened and rounded for purposes of reinforcement and decorative effect (see Figs. 1, 2, 4 and 5) to take the place of the edge folding heretofore required. Thickened portions 32 are provided around the eyelet holes 16 (see Figs. 1 and 6) to provide reinforcement which may be sufficient to eliminate the need for metal eyelets or may provide a firm base for the insertion of metal eyelets if desired. The outside edges 24 and the lower edges 20 of the lacing portions 12 of the throat piece 10 are provided with ledges 34 and 36 (see Figs. 3 to 6) for better cooperation with the parts of the shoe to which the throat piece 10 is to be secured. For example, as shown in Fig. 6, the edge of a leather shoe part illustrated as a quarter 25 may be placed on the ledge 34 and secured by stitching 42 to form a neat and strong connection.

The throat piece 10 may conveniently be molded in apparatus such as shown in Fig. 8 comprising separable mold parts 44 and 46 which cooperate to define a mold cavity for injection of heat softened thermoplastic material. The mold part 44 comprises a base sheet 48 of metal formed with a depressed area 50 having an area and depth to form a sheet of plastic corresponding in area to the lacing portions of a conventional shoe. Bosses 52 are provided in positions corresponding to the eyelets 16 desired in the lacing portions 12. Raised center portions 54 are provided to define the central space between the diverging lacing portions 12 of the throat piece to be molded. Lanes or channels 56 cross these raised portions 54 for the molding of spacing and reinforcing struts or braces 26.

The other mold part 46 comprises a base sheet 47 of metal formed with a depression 58 extending around the outline of the shoe segment desired to provide shaped edge portions 20 and 24 at the lower and outside edges of the shoe segment 10 for better cooperation with the remaining parts of the shoe to which the shoe segment is to be secured. Channels 60 extend along lines corresponding to the inner edges 18 of the lacing portions to form the thickened edge 18 for reinforcement and decorative effect. Depressed channels 62 and connecting loops 64 extend inwardly from these channels 60 to provide thickened reinforcing areas 32 for the eyelet holes 16 of the throat piece.

Positioning holes 66 are provided in the mold part 46 for receiving the pins 68 on the base sheet of the first described mold part 44. The mold parts 44 and 46 are assembled with the pins 66 in the holes 68 and are firmly held together to form a mold cavity by suitable means, e. g. stud bolts (not shown), extending through holes 70 in the mold parts. It will be understood that other means for securing together the mold parts may be employed.

The material from which the article is to be molded is injected in heat softened condition through an opening 72 in the second described mold part 46 and flow throughout the cavity defined by the assembled mold parts. Sufficient leakage occurs between the two mold parts so that the air in the cavity may escape and air escape ports have not been found necessary. Suitable materials for forming the throat piece or other shoe segment are the strong flexible thermoplastics such as plasticized polyvinyl chloride or high polyvinyl chloride content copolymers of vinyl chloride and vinyl acetate, polyethylene, polyamides such as nylon and other plastics of this nature. The thermoplastic material is heated to softened condition and injected into the mold by any suitable apparatus. After injection of the softened material and permitting it to cool and harden, the mold parts 44 and 46 are separated, the shoe segment, e. g. the throat piece 10, is stripped from the mold cavity 50, and any flashing around the throat piece 10 is trimmed off.

The throat piece 10 may be incorporated in a shoe upper (see Fig. 2) by lines of stitching 42 joining it to the quarter 25 at each side and to the vamp 21. The shoe upper is then mounted on a last and lasted. The throat piece 10 withstands the strains of the lasting operation, forces tending to separate the upper parts of the lacing portions 12 being taken up by the struts or braces 26 so that lacing cords are not required. Further manufacturing operations such as attaching the sole to the lasted shoe upper are then performed. When the shoe reaches the stage at which it is to be removed from the last (see Fig. 7) the braces or struts 26 are readily cut with a knife 74 leaving clean smooth edges to the lacing portions of the throat piece 10, and a tongue is sewn in place.

The throat piece 10 described is for use in a Bal type shoe. For a shoe of the blucher type (see Fig. 9) a somewhat similar throat piece 10a may be secured in place. In this throat piece 10a, the lacing portions 12a are thin sheet members with appropriately reinforced and shaped edges 18a, 20a, 24a and 30a and eyelet holes 16a and with struts or braces 26a to hold the lacing portions 12a in determined spaced relation during shoemaking and lasting. The lacing portions 12a of the throat piece 10a are not joined at the portion near the toe in this type of shoe. Shoe making operations and the removal of the struts or braces after completion of the shoe are similar to those required for the Bal type of shoe previously described.

To obtain advantages in addition to the primary advantage of the integral plastic throat piece, a modified throat piece 78 (see Fig. 10) may be employed with a special last 79 to enable more precise placement of a shoe upper on the last in shoemaking. For example, complementary registering devices shown as plugs 80 on the reinforcing members, i. e. the membrane 22 between lacing portions, and holes 82 in the last 79 may be provided to insure that the throat piece 78 and attached shoe upper parts are accurately positioned on the last 79. When the shoe upper is placed on a last with these positioning plugs 80 in holes 82, a high degree of precision is insured in placing the shoe upper squarely on the last 79 to give improved shoemaking. This registering feature is expected to be of value in mechanizing certain shoemaking operations.

In another modification, a throat piece 88 may be constructed with a tongue 90 as a part of the throat piece molding as shown in Fig. 11. The tongue 90 and throat piece 88 may be molded at the same time or the tongue 90 may be secured to the throat piece 88 by adhesive or stitching, or by a molding process in which the base of the tongue 88 is inserted in a slot in a throat piece mold and the tongue 88 united to the throat piece by the softened plastic flowing around and locking to the inserted portion of the tongue during the molding step. Other shoe parts may be joined to the throat piece or other shoe segment by the insertion of an edge, for example of the vamp and quarter, in openings in the edges of a throat piece mold so that the throat piece or other shoe segment is simultaneously molded and joined to such other shoe parts.

While the present invention is of particular value in the throat pieces above described since it eliminates a large number of operations and gives a strong construction and neat appearance, some of the advantages of the invention are obtainable in the construction of shoes including cutouts or openings as in women's shoes. It has been found possible to form a molded integral plastic sheet-like shoe upper segment 92 simulating a plurality of joined strips 94 (Figs. 12 and 13) connected by integral temporary reinforcing membranes 98 between the strips 94. These membranes 98 serve to resist distortion of the shoe upper segment 92 when the shoe upper segment is subjected to lasting strains. Such shoe upper segment 92 may be assembled with other shoe parts, positioned on a last, lasted and subjected to further shoe operations including sole attaching to form a completed shoe (see Fig. 14). The reinforcing membranes 98 are then removed by simply running a knife 74 across them.

The plastic material cuts cleanly so that a clean, smooth edge is provided and no trace of the connection need remain in the finished shoe.

Having thus described our invention, what we claim as new and desire to secure by Letters Patent of the United States is:

1. A unitary molded throat piece of substantially inextensible plastic material shaped to be assembled with a shoe upper and to constitute the only upper element in that area of a finished shoe, said throat piece comprising spaced lacing portions each formed with a plurality of lacing eyelets, said portions having spaced inwardly facing oppositely disposed edges defining an opening therebetween, a connecting member integral with said lacing portions and bridging the opening between said edges to maintain them in determined spaced relation during the lasting of the upper, said connecting member being adapted to be severed from said lacing portions along said edges after the lasting of the upper.

2. A unitary molded throat piece of substantially inextensible plastic material shaped to be assembled with a shoe upper and to constitute the only upper element in that area of a finished shoe, said throat piece comprising lacing portions having inwardly facing oppositely disposed edges spaced apart to leave a substantially V-shaped opening, a bar integral with said lacing portions and extending transversely below the base of said V-shaped opening, a plurality of eyelets formed integrally with each lacing portion, a connecting member joined to said lacing portions and bridging said V-shaped opening, said connecting member being adapted temporarily to maintain the lacing portions in determined spaced relation during the lasting of the upper and to be severed along said edges defining the V-shaped opening after the lasting of the upper.

3. A unitary molded throat piece of substantially inextensible plastic material shaped to be assembled as a unit with the vamp and quarters of a shoe upper and to become a constituent component of said upper, said throat piece comprising spaced lacing portions having inwardly facing oppositely disposed edges defining an opening therebetween, each lacing portion being provided with a row of lacing holes adjacent one edge thereof, the material surrounding said lacing holes being substantially thicker than the main body of the lacing portion, and a connecting member bridging the opening between the oppositely facing edges of and integral with said lacing portions, said connecting member being adapted temporarily to maintain the lacing portions in determined spaced relation during the lasting of the upper and to be severed along said oppositely facing edges of the lacing portions after the lasting of the upper.

4. As an article of manufacture for use in the making of shoes having uppers comprising vamp and quarter members, a unitary molded throat piece and tongue of substantially inextensible plastic material shaped for assembly with the vamp and quarter members of an upper to constitute the only upper element in that area of a finished shoe, the throat piece comprising flexible spaced lacing portions having spaced inwardly facing oppositely disposed edges defining an opening therebetween, each of said lacing portions being formed with a plurality of lacing eyelets, and a member joined to the inner, oppositely facing edges of said lacing portions to bridge the opening between said lacing portions and to maintain the latter in determined spaced relation during shoe making operations, said bridging member being adapted to be severed along said inner edges of the lacing portions after completion of the shoe making operation.

5. A unitary molded throat piece of substantially inextensible plastic material shaped to be assembled with a shoe upper and to constitute the only upper element in that area of a finished shoe, said throat piece comprising spaced flexible lacing portions each formed with a plurality of lacing eyelets, said lacing portions having spaced inwardly facing oppositely disposed edges defining an opening therebetween, and a bridging member integral with said lacing portions and bridging the space between said oppositely facing edges to maintain said lacing portions in determined spaced relation during the lasting of the upper and to be severed along the oppositely disposed edges of said lacing portions after the lasting operation, said bridging member being provided with integral means adapted to cooperate with complemental means on a last to position the upper accurately with relation thereto prior to the lasting of the upper.

6. For use in the manufacture of shoes of the class in which the throat portions thereof are provided with lacing openings, the combination of an upper and a throat piece therefor of substantially inextensible plastic material molded as a single unit and having a shape complemental to the shape of the throat portion of the upper with which it is assembled, said throat piece comprising spaced lacing portions each provided with a row of integrally formed lacing holes and having inwardly facing, oppositely disposed edges defining a lacing opening therebetween, and a member integral with said lacing portions and extending from the oppositely disposed edges thereof to bridge the opening between them, said bridging member being adapted temporarily to maintain the lacing portions of the throat piece in determined spaced relation during the lasting of the upper and to be severed along said oppositely disposed edges after the lasting of the upper, the throat portion of the upper extending along the outer margin of said throat piece and being secured thereto, said throat piece constituting the only upper component in that area of the finished shoe.

References Cited in the file of this patent

UNITED STATES PATENTS

| | | |
|---|---|---|
| 236,155 | Harris | Jan. 4, 1881 |
| 580,911 | Usher | Apr. 20, 1897 |
| 715,472 | French | Dec. 9, 1902 |
| 1,088,665 | Merrick | Feb. 24, 1914 |
| 1,159,693 | MacFarland | Nov. 9, 1915 |
| 2,001,841 | Goth | May 21, 1935 |
| 2,129,106 | Szerenyi | Sept. 6, 1938 |
| 2,198,707 | Sherman | Apr. 3, 1940 |
| 2,654,904 | L'Hollier | Oct. 13, 1953 |

FOREIGN PATENTS

| | | |
|---|---|---|
| 576,175 | Great Britain | Mar. 21, 1946 |